United States Patent
Alameh et al.

(10) Patent No.: US 9,354,698 B2
(45) Date of Patent: May 31, 2016

(54) DIFFERENTIAL PROXIMITY SENSING AND SIDE DETECTION FOR AN ELECTRONIC DEVICE

(71) Applicant: Google Technology Holdings LLC, Mountain View, CA (US)

(72) Inventors: Rachid M. Alameh, Crystal Lake, IL (US); Eric L. Krenz, Crystal Lake, IL (US); Jason P. Wojack, Libertyville, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 147 days.

(21) Appl. No.: 13/721,287

(22) Filed: Dec. 20, 2012

(65) Prior Publication Data

US 2014/0176447 A1  Jun. 26, 2014

Related U.S. Application Data

(60) Provisional application No. 61/731,602, filed on Nov. 30, 2012.

(51) Int. Cl.
*G06F 3/01* (2006.01)
*G06F 1/16* (2006.01)

(52) U.S. Cl.
CPC ............... *G06F 3/01* (2013.01); *G06F 1/1626* (2013.01); *G06F 1/1684* (2013.01)

(58) Field of Classification Search
CPC ......... G06F 3/01; G06F 3/044; G06F 3/0488; G06F 3/0418; G06F 1/1626; G06F 1/1684; H04M 2250/12
USPC .................................................. 345/156–174
See application file for complete search history.

(56) References Cited

U.S. PATENT DOCUMENTS

| | | | |
|---|---|---|---|
| 5,565,876 A * | 10/1996 | Murakami et al. ............ 343/713 |
| 8,107,878 B2 | 1/2012 | Alameh et al. |
| 8,502,800 B1 * | 8/2013 | Vier ............................... 345/174 |
| 8,615,195 B2 * | 12/2013 | Moosavi ....................... 455/41.1 |
| 2002/0135523 A1 * | 9/2002 | Romero et al. ............... 343/741 |
| 2004/0204000 A1 * | 10/2004 | Dietrich et al. ............ 455/550.1 |
| 2008/0218493 A1 * | 9/2008 | Patten et al. .................. 345/173 |
| 2010/0081374 A1 * | 4/2010 | Moosavi ....................... 455/41.1 |
| 2010/0134423 A1 * | 6/2010 | Brisebois et al. ............. 345/173 |
| 2011/0012793 A1 * | 1/2011 | Amm et al. ................... 343/702 |
| 2011/0037624 A1 * | 2/2011 | Pance et al. ..................... 341/33 |

(Continued)

FOREIGN PATENT DOCUMENTS

WO  2014/085649 A2  6/2014

OTHER PUBLICATIONS

International Search Report and Written Opinion for International Application No. PCT/US2013/072324, mailed Jun. 6, 2014, 10 pages.

(Continued)

*Primary Examiner* — Alexander Eisen
*Assistant Examiner* — Abhishek Sarma (57) ABSTRACT

An electronic device includes a housing enclosing a motion sensor and a first capacitive proximity sensor on a first planar side of the electronic device. A second capacitive proximity sensor on a second planar side of the electronic device within the housing is monitored for determining the differential amount of signal change of the first capacitive proximity sensor relative to the second capacitive proximity sensor.

15 Claims, 5 Drawing Sheets

(56) References Cited

U.S. PATENT DOCUMENTS

| | | | |
|---|---|---|---|
| 2011/0261007 A1* | 10/2011 | Joharapurkar et al. | 345/174 |
| 2011/0312349 A1* | 12/2011 | Forutanpour et al. | 455/466 |
| 2012/0214412 A1* | 8/2012 | Schlub et al. | 455/41.1 |
| 2013/0106710 A1* | 5/2013 | Ashbrook | 345/173 |
| 2013/0120310 A1* | 5/2013 | Siska | 345/174 |
| 2013/0231046 A1* | 9/2013 | Pope et al. | 455/41.1 |
| 2013/0241780 A1* | 9/2013 | Amm et al. | 343/702 |
| 2014/0111474 A1* | 4/2014 | Bytheway | 345/174 |

OTHER PUBLICATIONS

International Preliminary Report on Patentability for PCT Patent Application No. PCT/US2013/072324, mailed on Jun. 11, 2015, 8 pages.

* cited by examiner

DIFFERENTIAL PROXIMITY SENSING AND SIDE DETECTION FOR AN ELECTRONIC DEVICE

BACKGROUND

Priority is taken from Provisional Application 61/731,602 filed on Nov. 30, 2012 by Alameh et al. and incorporated herein in its entirety by reference.

Sophisticated electronic devices, including mobile communication devices such as smartphones and tablet computers are configured with a multitude of sensors to aid the electronic device in accomplishing tasks that the user of the electronic device desires. These sensors may be placed in several locations internal to the electronic device or be coupled externally to the electronic device as well.

Greater personalization of the electronic device to the user accomplishes a more secure ownership link for the user and greater loyalty to the vendor of the electronic device. Users also desire greater confidence in functionality of the electronic device in varied settings.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate example embodiments of concepts that include the claimed invention, and explain various features of those example embodiments.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Before describing in detail embodiments that are in accordance with the present invention, it should be observed that the embodiments reside primarily in combinations of method steps and device components related to networked or electronically coupled objects in an electronic device. Accordingly, the device components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the method, or device that comprises the element.

Figure 1:
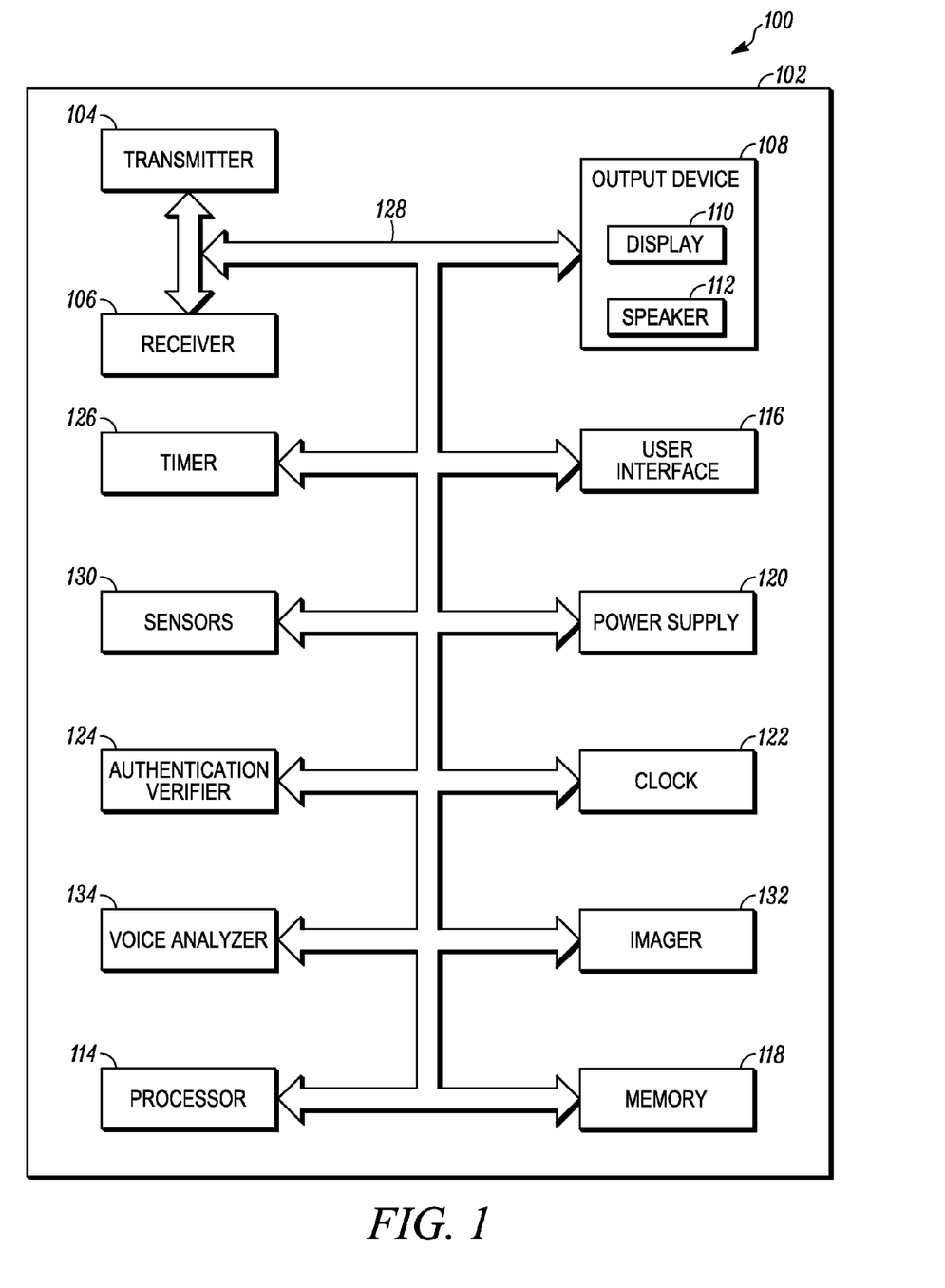
FIG. 1 illustrates an example system configured for the electronic device.

Referring to FIG. 1, an example wireless or wired communication system 100 is shown in a block form that is intended to be representative of a variety of different wireless or wired communication systems that may be envisioned by those skilled in the art. In one embodiment, the wireless or wired communication system 100 includes internal hardware components of an electronic device 102, for example, an electronic wireless communications device.

The block diagram for system 100 of the electronic device 102 includes various electronic components configured for enabling network communication and sensory input and output for the electronic device 102. The example components include a transmitter 104, a receiver 106, an output device 108 including a display 110 and an acoustic output device such as a speaker 112, a processor 114, a user interface 116, a memory 118, a power supply 120, a clock 122, an authentication verifier 124 and a timer 126, each capable of communicating with one or more components of the electronic device 102. For example, as shown in FIG. 1, all electronic components are coupled to a bidirectional system bus 128, having one or more of a data communication path, a control communication path or a power supply path. Other contemplated operational electronic components for the electronic device 102, but not shown in FIG. 1 may include a microphone, an appropriate optical sensor or proximity sensor (such as an infra-red light emitting diode and configured sensor receiver) to enable facial, iris, retina, and/or eye vein recognition, for example.

The transmitter 104 enables the electronic device 102 (configured as a communication device) to transmit communication signals and the receiver 106 enables the electronic device 102 to receive RF signals through an antenna (not shown explicitly, but antenna may be either internal or external to the electronic device 102). In accordance with the embodiment, the receiver 106 converts the RF signals received from the antenna to digital data for use by the processor 114. Each transmitter 104 and/or the receiver 106 of the communication device utilizes wireless signaling technology for communication, such as, but are not limited to, peer-to-peer or ad hoc communications such as Bluetooth, Zigbee, near field communication, infrared, peer-to-peer WiFi, wireless HDMI, wireless USB, HomeRF, and the like. Each wireless transceiver 101 may also utilize wireless technology for communication, such as, but are not limited to, cellular-based communications such as analog communications (using AMPS), digital communications (using CDMA, TDMA, GSM, iDEN, GPRS, or EDGE), and next generation communications (using UMTS, WCDMA, LTE, LTE-A or IEEE 802.16) and their variants.

The output device 108 may generate visual indications of data generated during operation of the processor 114. The visual indications may include prompts for human operator input, calculated values, detected data, etc. Additionally, the output device 108 may include a video output component such as a display device 110 which may include one or more of the following example display technologies: a cathode ray tube, a liquid crystal display, an OLED display (including AMOLED and super-AMOLED), a plasma display, an incandescent light, a fluorescent light, a front or rear projection display, or a light emitting diode indicator. Other examples of output components 108 include an audio output component such as a speaker 112, alarm and/or buzzer, and/or a mechanical output component such as vibrating or motion-based component, including haptic technology. In addition, electrical connectors may also be included that enable connection to display devices such as a large monitor or a television monitor.

In accordance with one or more embodiments, the user interface 116 may be connected to the processor 114 for entering data and commands in the form of text, touch input, gestures, etc. The user interface 116 is, in one embodiment, a touch screen device, but may alternatively be an infrared proximity detector or sensor or any input/output device combination capable of sensing gestures and/or touches including a touch-sensitive surface. In addition, the user interface 116 may include one or more additional components, such as a video input component such as an optical sensor (for example, a camera or CCD or CMOS imaging technology), an audio input component such as a microphone, and a mechanical input component such as button or key selection sensors, a touch pad sensor, another touch-sensitive sensor, a capacitive sensor, a motion sensor, and/or a pointing device such as a joystick and controllable motion buttons, a track ball, a touch pad, a rocker switch, a touch screen, a TTY input device for disabled persons, a Braille key input, a fingerprint sensor, or a pad for an electronic stylus, for example. One or more of these user interface devices may function in multiple modes. That is a fingerprint sensor may also function as a touch pad or trackpad, for example. The user interface 116 enables a user of the communication device 102 to provide an input for the communication device 102.

Still referring to FIG. 1, the memory 118 may be used to store data and instructions for the operation of the processor 114. In various embodiments, the memory 118 may be one or more separate components and/or may be partitioned in various ways for various purposes such as but not limited to, optimizing memory allocations, etc. Thus, it is to be understood that memory 118 illustrated in FIG. 1 is for illustrative purposes only, for the purpose of explaining and assisting one of ordinary skill in understanding the various embodiments described herein.

Additionally, the power supply 120, such as a battery, may be included in the internal components of the electronic device 102 for providing power to the other internal components while enabling the electronic device 102 to be portable. The power supply 120 may also be configured for greater optimization, such as reduction of current loss and may be connected via circuitry to other components for greater efficiency of power usage by the electronic device 120.

Furthermore, the authentication verifier 124 of FIG. 1 is configured to verify different authentication means such as facial, iris, retina, eye vein, and/or face vein recognition or other facial feature or facial component, password recognition, fingerprint recognition, and voice pattern recognition, for example. The authentication means may be stored in memory 118. The authentication verifier may also draw upon stored information in memory 118, such as a look up table to compare and contrast data, including data related to information on facial, iris, retina, and/or eye vein information, fingerprints, breath analysis, body odor, voice patterns, etc. The electronic device 102 further includes a clock 122 and a timer 126. The timer 126 may be synchronized with the clock 122 and measures time intervals. In another embodiment, the timer 126 and the clock 122 may be integrated together as a single unit.

Moreover, the processor 114 operates in conjunction with the data and instructions stored in the memory 118 to control the operation of the communication device 102 and monitor sensors 130. The processor 114 may be implemented in many different forms, for example as a microcontroller, a digital signal processor, hard-wired logic and analog circuitry, or any suitable combination of these forms and formats. The sensors 130 may be capacitive-type sensors, force-based sensors, proximity sensor, ambient light sensor, acoustic sensors, piezo-electric sensors, thermal-touch sensors, proximity sensors, touch sensors, fingerprint sensors, imaging sensors, or accelerometers, magnetometers, and gyroscopes, or any suitable combination of these sensors, for example. The sensors 130 may be directly coupled to one or more timers 126 to aid in determining how long the sensory input received by the sensors 130 has been active or inactive.

It is to be understood that FIG. 1 is for illustrative purposes only and is primarily for, although not solely for, explaining the information that may be stored in memory or captured by one or more sensors for the various embodiments of an electronic device in accordance with the present disclosure, and is not intended to be a complete schematic diagram of the various components and connections for an electronic device. Therefore, an electronic communication device, for example, will comprise various other components not shown in FIG. 1, and/or have various other internal and external configurations, and still be within the scope of the present disclosure. Also, one or more of these components may be combined or integrated in a common component, or some of the component's features may be distributed among multiple components. Also, the components of the electronic device 102 may be connected differently that that shown in FIG. 1 et al., without departing from the scope of the invention.

Figure 2:
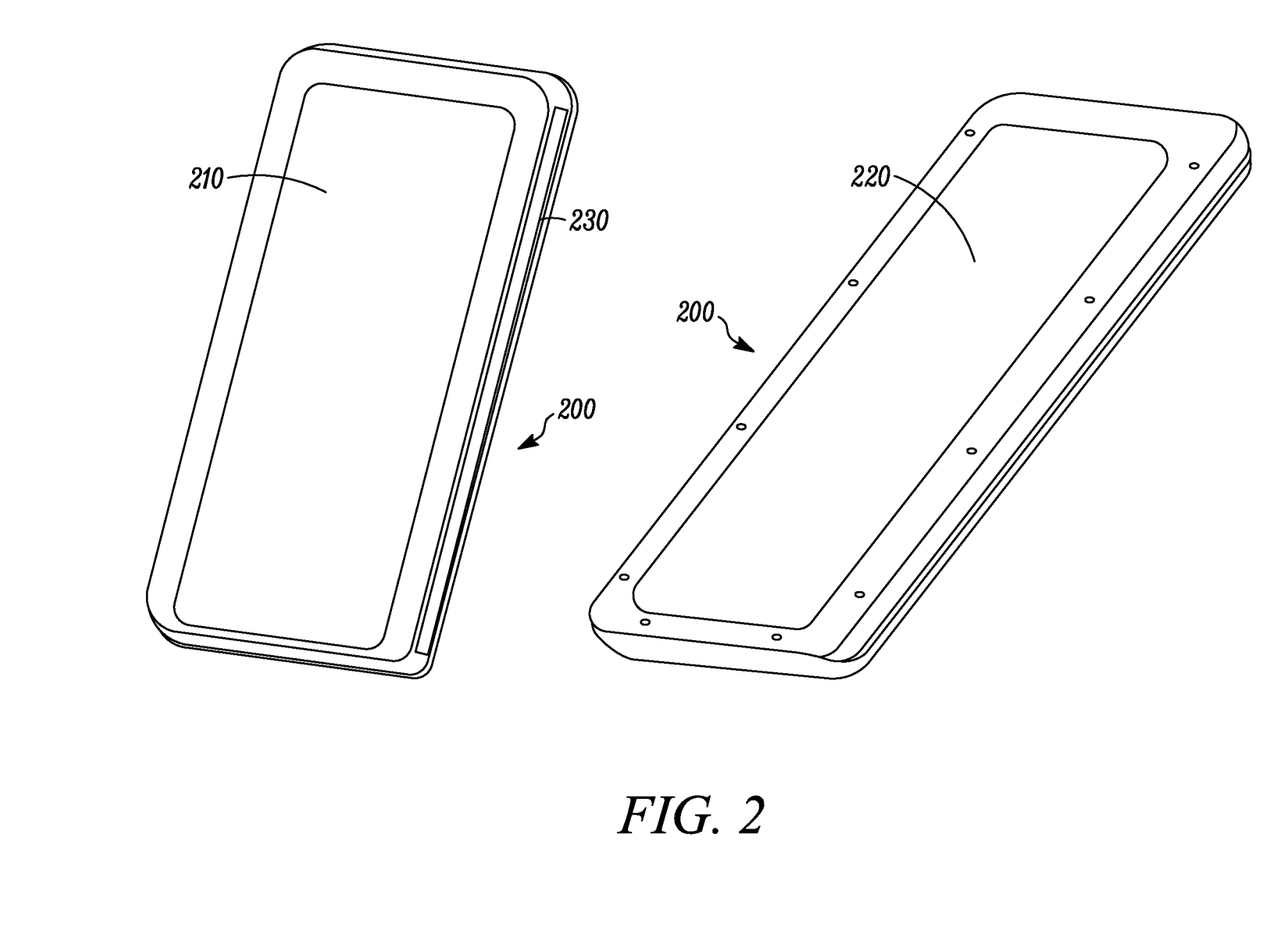
FIG. 2 illustrates sensor locations for the electronic device.

Referring to FIG. 2, an electronic device 200 such as a smartphone or tablet computer comprises a front face that includes an internal front capacitive proximity sensor 210 and a back or rear face that includes an internal rear capacitive proximity sensor 220. Optionally, the electronic device 200 may also comprise an internal side capacitive proximity sensor 230 located around the perimeter of the electronic device 200. Each proximity sensor 210, 220, and 230 may be monitored for its relative signal strength and detection abilities; and may be simple on/off touch sensors, for example. Each proximity sensor may be compared with each other proximity sensor to provide a differential comparison between one or more of the other proximity sensors.

The "differential" nature associated with the front and rear capacitive proximity sensors enables simpler hardware design and eliminates time-consuming calibration of the sensors. One working example uses a method to analyze differential capacitive measurement as a means to detect when the electronic device 200 is placed in a user's pocket with the front face of the electronic device facing outwards with respect to the user. That is, if the electronic device is place in a pocket while facing outwards, then the differential capacitive proximity method may be triggered by the rear sensor 220 relative to the front sensor 210 generating a low output signal.

Alternatively, when the electronic device is oriented inwards within the pocket of the user, the output signal changes to a higher or more positive output signal. Additionally, the side capacitive proximity sensor 230 may be used to confirm pocket detection in the above example. That is, when the side capacitive proximity sensor 230 senses no user touching or gripping of the electronic device it may provide one indication along with the differential capacitive measurement that the electronic device is in a pocket, for example. In one embodiment, the capacitive proximity sensor's gain or sensitivity may be adaptively or dynamically adjusted (i.e., increased or decreased) correlating to whether the side capacitive proximity sensor 230 senses a touch and an internal accelerometer of the electronic device senses motion corresponding to whether the electronic device has moved.

Figure 3:
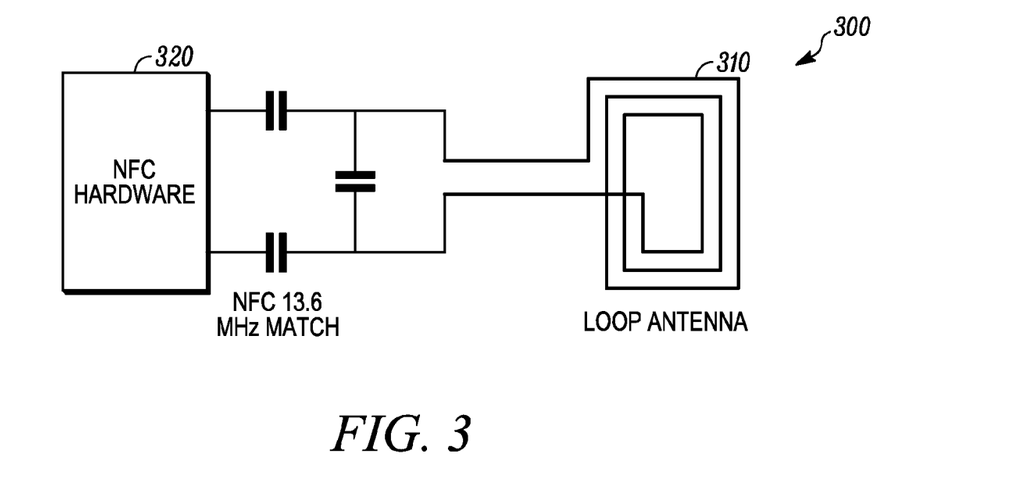
FIG. 3 shows an example conventional Near Field Communication (NFC) topology.

FIG. 3 illustrates an impedance matching circuit 300 for a loop antenna 310 coupled to near field communication (NFC) hardware 320. For a radio frequency range (e.g., approximately 13.6 MHZ) an impedance matching circuit coupled to both the loop antenna 310 and NFC hardware 320 provides an impedance match (measured in ohms) to enable efficient transfer of communication signals. The loop antenna 310 forms an alternative capacitive proximity sensor that may be used in electronic device 100.

The alternative capacitive proximity sensor, loop antenna 310, advantageously allows efficient utilization of precious space within the electronic device 100. In one embodiment, loop antenna 310 acts as the rear proximity sensor 220 and provides a relative or differential output when contrasted with front proximity sensor 210. Such differential assessment may be performed via software logic. A software analysis can provide an interpretation of the shape of a touch input as provided by a user, and may employ dynamic power tuning for impedance matching circuit 300 as well.

Figure 4:
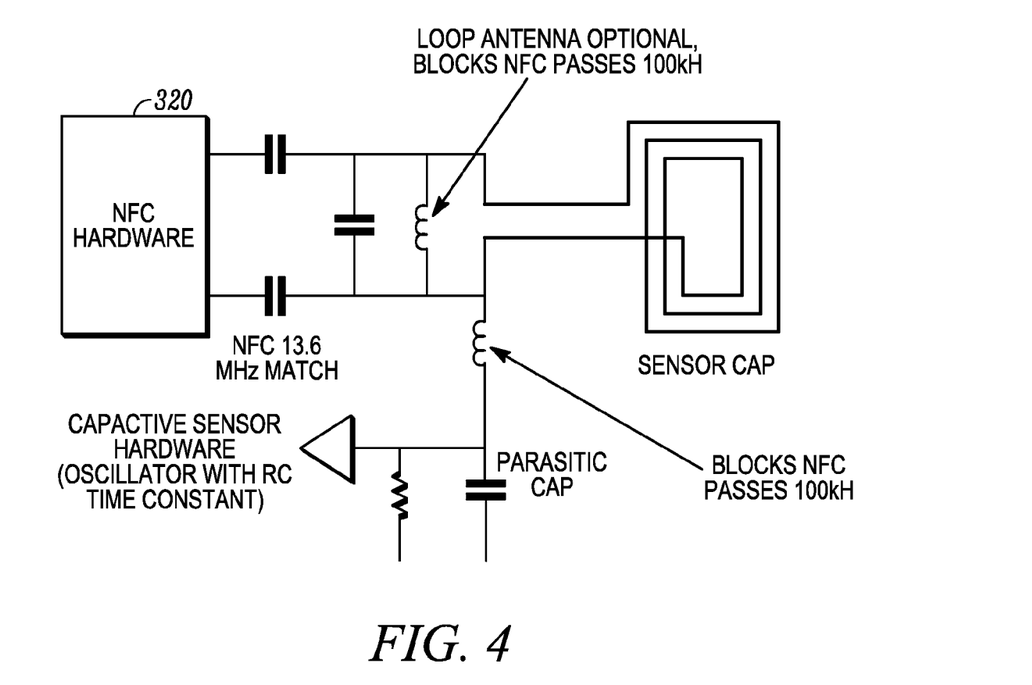
FIG. 4 illustrates employing an electrical isolation method for the NFC topology in FIG. 3.

A further improvement for loop antenna 310 as a conductive sensor plate area for receiving touch inputs on the rear or back side of electronic device 100 will provide isolation means to reduce likely interference between impedance matching circuit 300 and capacitive proximity sensor 210 (as shown in FIG. 2). FIG. 4 illustrates employing isolation or blocking coils to enable functional separation between the NFC sensing mode and the capacitive proximity touch sensing mode. Specifically, the inductors in FIG. 4 may block NFC transmissions, while allowing or passing a 100 kHz signal from the capacitive proximity sensor 210 or 230. This signal isolation is possible because the frequency of operation of an NFC circuit is two orders of magnitude higher than that of the capacitive sensor (e.g., NFC can be approximately 13.6 MHz versus capacitive sensor at approximately tens of KHz). The capacitors employed in the impedance matching circuit 300 may also serve as blocking mechanisms to isolate the capacitive proximity touch signal from capacitive proximity sensor 210, for example. The capacitive sensor hardware may comprise an oscillator with a resistor and a parasitic capacitor to form an RC time constant.

Figure 5A:
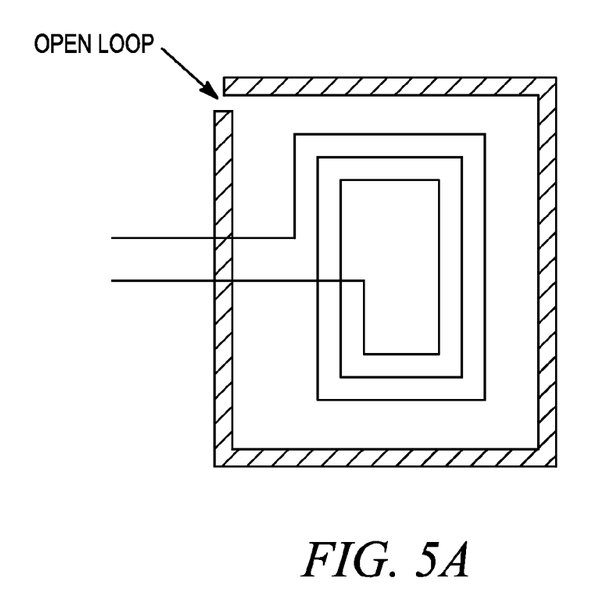
FIG. 5A illustrates employing an open sensor loop around the sensing elements of an NFC loop antenna.

In another embodiment, an open loop conductor surrounding the loop antenna 310 of impedance matching circuit 300 is isolated from ground in order to enable the open loop conductor to function as a capacitive sensor for the electronic device. FIG. 5A shows one such loop conductor as the capacitive sensor.

Figure 5B:
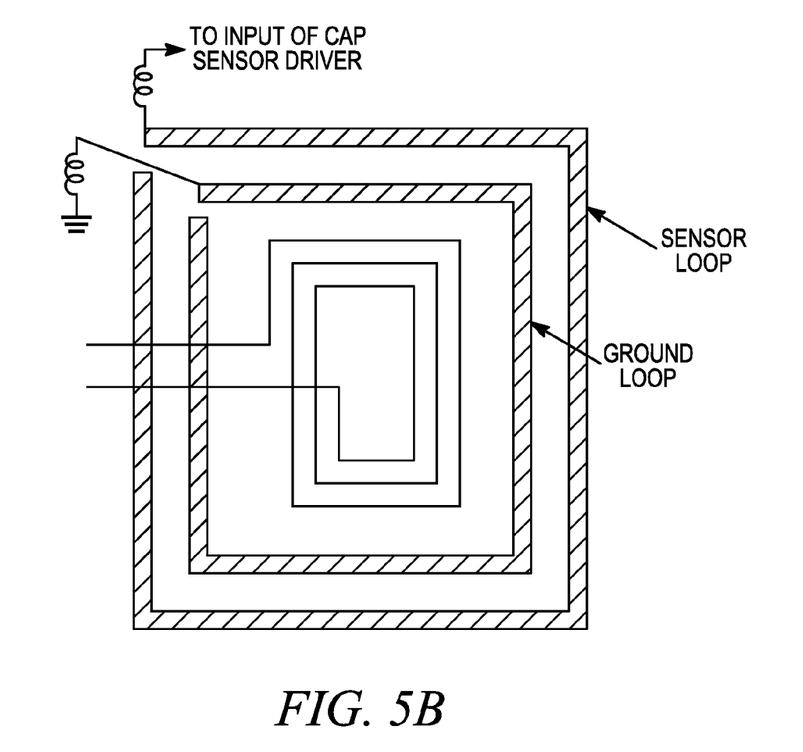
FIG. 5B illustrates employing an open ground loop in combination with the open sensor loop of FIG. 5A.

FIG. 5B shows employing a similar open loop conductor as the capacitive touch sensor and an additional open loop conductor positioned around the loop antenna 310 to form a "driven shield" for the capacitive touch sensor. A driven shield can be thought of as a shield elevated to the same voltage potential as the sensor voltage potential, thus preventing an electro-magnetic field to form, because of the NFC hardware's proximity to the capacitive sensor.

The loop antenna 310 conventionally is thin and has a small surface area that may be inadequate for performing capacitive proximity sensing when the electronic device 100 is in a pocket or covered by several layers of clothing, for example. The open loop conductor in FIG. 5A is shown as being wrapped or surrounding the loop antenna 310 and is used as the capacitive sensor in this embodiment. The open loop conductor is a non-closed (i.e., open) loop that prevents eddy currents from forming at the NFC operating frequency, and thereby interfering with functionality of the NFC hardware 320 (as shown in FIG. 3). Second coil also provides greater cross sectional area to trigger the capacitive sensor mode with a greater range.

Referring to FIG. 5B, open loop conductor may be employed in another embodiment in combination with loop antenna 310 and open loop conductor. Open loop conductor is also an open loop and is adjacent to the open loop conductor. Open loop conductor may also be grounded to the chassis of electronic device 100, thus coupling a user of the electronic device 100 to battery ground in order to have the capacitive sensor function properly. This methodology is a self-capacitance scheme, which is different from mutual capacitance. In a self-capacitance scheme, the device has one capacitance plate and the user's body constitutes the other plate when the user is brought into proximity with the device. Because the user stands on earth ground, and the device is powered by battery ground a means to couple the two types of grounds is needed, which is accomplished as described above, mainly when the user comes into proximity with the sensor plate the user also comes into proximity with the ground plate as shown and described in detail for FIG. 6.

In contrast, in the mutual capacitance scheme the capacitive plates/conductors/electrodes are both present within the device forming an electromagnetic field between the conductive plates or areas. The proximity of the user disturbs the field, which is used as an indicator of user proximity to the device.

Open loop conductor utilizes two operational amplifiers (op amps) to form a driven shield. One op amp is coupled to an input of the capacitive sensor driver, while the other op amp coupled to an RF choking coil or inductor, and preferably of the follower topology type, which drives a driven shield/conductor raising it to the same voltage potential as the touch sensor conductor, thus preventing the formation of unwanted electric fields between the sensor conductor and the driven shield.

Three conductors are shown, the touch sensor conductor, a ground return conductor, and a driven shield coupled to a driven shield conductor. This topology is depicted in FIG. 6.

Figure 6:
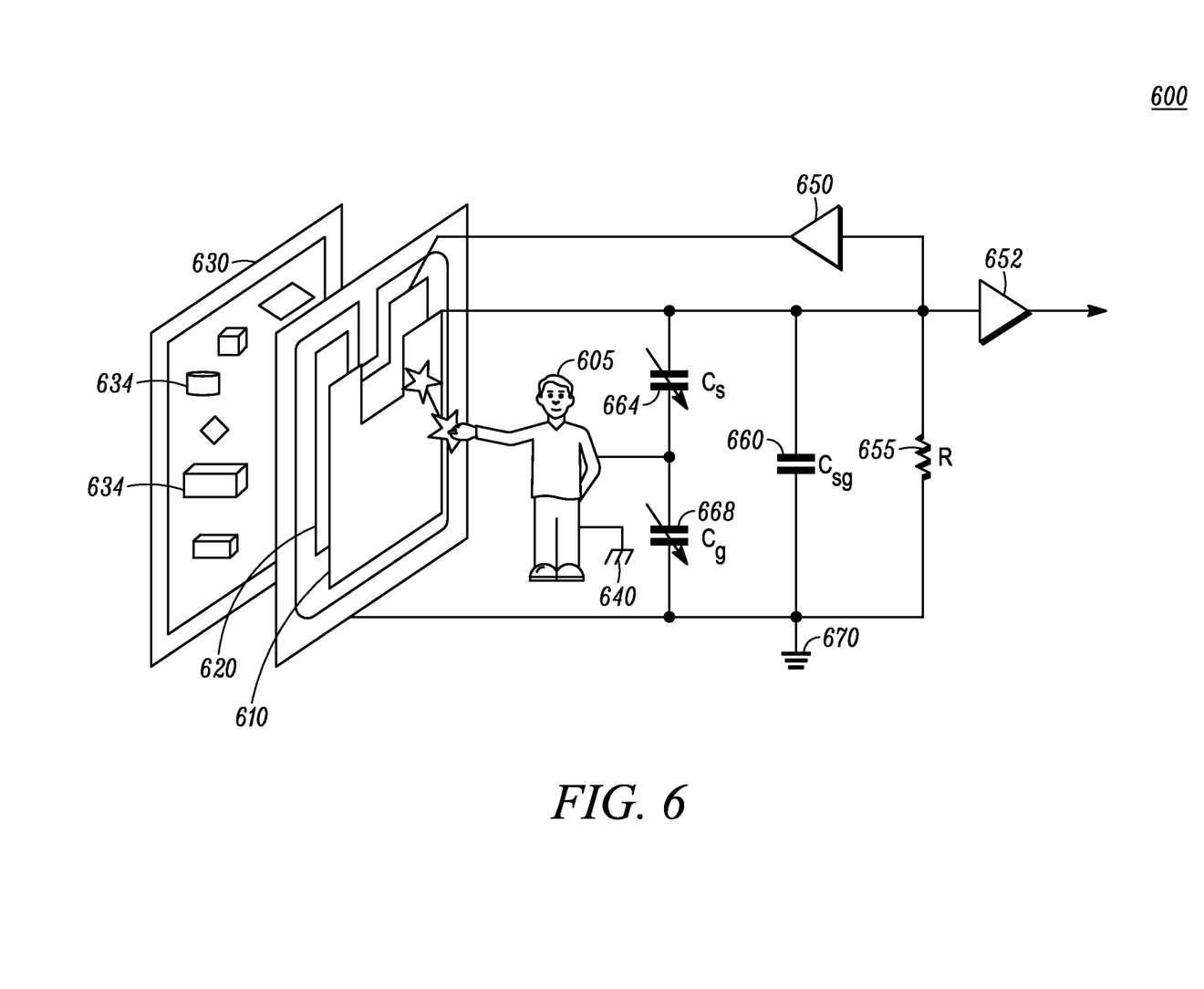
FIG. 6 illustrates an example schematic for implementing a capacitive touch sensor in an electronic device.

Referring to FIG. 6, a schematic of an example touch sensor circuit 600 (of the self-capacitance topology) is shown. User 605 comes in proximity with sensor 610 and at the same time comes in proximity with a nearby ground plate 603 to complete the circuit via a change in the capacitance value and coupling earth ground to a battery/chassis ground. In this exemplary embodiment a capacitance controlled oscillator circuit is used to sense contact with the touch sensor 610 by measuring oscillation frequency as a function of capacitance, which results in reduced oscillation when the user is proximate or touches the sensor plate 610. Specifically, when the user is not touching or is not proximate to the sensing plate 610, the oscillator circuit oscillates at a nominal frequency in the tens of KHz. When the sensor is touched, the capacitor value increases due to user proximity resulting in a lower oscillation frequency. That change in the oscillation frequency is an indication of a user's touch. The lower the frequency, the closer the user is to the sensing plate 610.

The touch sensor 610 comprises a printed circuit board (PCB) 630 for holding electronic components 634, such as integrated circuit chips, resistors, capacitors, amplifiers, or electrical traces made of conductive material. PCB 630 is secured to a chassis for the electronic device. The sensor plate 610 is coupled to a first op amp 650 such that the circuit 600 operates at a reference frequency which may be in one embodiment 200 kHz or less. In the example, touch sensor circuit 600 further comprises a ground plate 603 placed adjacent to the touch sensor plate 610 to couple user to battery ground as described above.

To help shield the sensor from noisy hardware in the device, a driven shield topology (as described above) is employed. The driven shield 620 is raised via a second op amp 650 to the same potential as the touch sensor plate 610. The greater the capacitance values that are created by contact with the sensor plate 610, the greater the change in the oscillator frequency. Therefore, as the capacitance increases the oscillator circuit frequency decreases. The change in frequency, i.e., a drop from 200 kHz, indicates that there is an object 605 adjacent to the sensor plate 610 and hence adjacent to the housing of electronic device 100. The capacitance is a function of the size of the sensor plate 610, user proximity, the grounding capacitance, and other factors.

Different frequencies of the circuit may therefore be assigned to different functions of the electronic device 100. For example, touching a small portion of a touch sensor 610 may increase the speaker volume to 50% volume, while touching substantially the entire touch sensor may increase the speaker volume to 100% volume.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions, and the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Referring once again to FIG. 2, an electronic communication device 200 is illustrated. The communication device 200 can comprise one or more of the components of FIG. 1. In one arrangement, the communication device can be a mobile communication device, such as a mobile phone, such as a smart phone, a mobile computer, such as a tablet computer or laptop computer, a personal digital assistant (PDA), or the like. In this regard, the communication device 200 can be configured to provide voice, audio/video and/or text communications. In another arrangement, the communication device 200 can be a processing system, such as a computer, configured to provide voice, audio/video and/or text communications. It should be appreciated, however, that the communication device 200 can be implemented in the form of any system comprising a processor and memory that is capable of performing the functions described within this specification, for example by storing and/or executing program code.

In this regard, the communication device 200 can include at least one processor 114 coupled to memory elements 118 through a system bus 128. As such, the communication device 200 can store program code within at least one memory element 118. The processor 114 can execute the program code accessed from memory elements 118 via the system bus 128. The processor can comprise, for example, one or more central processing units (CPUs), one or more digital signal processors (DSPs), one or more application specific integrated circuits (ASICs), one or more programmable logic devices (PLDs), a plurality of discrete components that can cooperate to process data, and/or any other suitable processing device. In an arrangement in which a plurality of such components are provided, the components can be coupled together to perform various processing functions as described herein.

The memory elements 118 can include one or more physical memory devices such as, for example, local memory and one or more bulk storage devices, that store data. Local memory refers to random access memory or other non-persistent memory device(s) generally used during actual execution of the program code. The bulk storage device(s) can be implemented as a hard disk drive (HHD), flash memory, for example as a solid state drive (SSD), or other persistent data storage device. The communication device 200 also can include one or more cache memories (not shown) that provide temporary storage of at least some program code in order to reduce the number of times program code must be retrieved from the bulk storage device during execution.

The communication device 200 also can include a GPS receiver (not explicitly shown in FIG. 1) that receives signals from a GPS system to identify the present location of the communication device 200. GPS receivers are well known to those skilled in the art. The GPS receiver can be communicatively linked to the processor via the system bus 128.

The communication device 200 further can include a transceiver 104, 106 coupled to the processor 114 via the system bus 128. The transceiver 104, 106 can modulate and demodulate signals to convert signals from one form to another, and can transmit and/or receive such signals over one or more various wireless communication networks. In illustration, the transceiver 104, 106 can be configured to communicate data via IEEE 802 wireless communications, for example, 802.11 and 802.16 (WiMax), WPA, or WPA2. In another example, the transceiver 104, 106 can communicate data via TDMA, CDMA, WCDMA, GSM, UMTS, GPRS, EUTRAN, UMB, OFDM, LTE, direct wireless communication, etc. Further, the transceiver 104, 106 also can be configured to communicate over a wireless communication link using any of a myriad of communications protocols.

In addition to, or in lieu of, the transceiver 104, 106, the communication device 200 can include a network adapter coupled to the processor 114 via the system bus 128. Modems, cable modems, and Ethernet cards are examples of different types of network adapters that can be used with the communication device 200.

The communication device further can include a display 110. In one arrangement, a graphics processor can be provided graphics processing for images and video presented on the display 110. In another arrangement, the graphics processing can be performed by the processor 114. The display can be a touchscreen, though this need not be the case. Other input/output (I/O) devices, such as a keypad, a keyboard, buttons, keys, a mouse, an audio processor, or the like also can be coupled to the communication device 200, either directly to the system bus 128 or through intervening I/O controllers.

The memory elements 118 can store an operating system which can be implemented in the form of computer-readable program code executable by the processor 114. The operating system can include a user interface (UI) module 116. During execution, the UI module 116 can present images and/or video on the display 110, output audio, receive user inputs, and the like. During execution, an application can, for example, process information to further the operation of the communication device in terms of user friendly features like efficient power application, speed dialing, etc.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

We claim:

1. An electronic device, comprising:
   a housing;
   a first capacitive proximity sensor on a front of the electronic device included in the housing; a second capacitive proximity sensor on a back of the electronic device included in the housing, the second capacitive proximity sensor employing a near field communication (NFC) loop antenna conductor as a capacitive sensing surface and including at least one blocking coil configured to separate NFC sensing circuitry of the electronic device from capacitive proximity touch sensing circuitry of the electronic device; and
   an open loop conductor surrounding the NFC loop antenna conductor and in close proximity to the NFC loop antenna conductor,
   wherein the electronic device is configured to:
   monitor a signal produced by the first capacitive proximity sensor; monitor a signal produced by the second capacitive proximity sensor;
   compare the signal produced by the first capacitive proximity sensor with the signal produced by the second capacitive proximity sensor; and
   based on the comparison, determine a differential amount of change between the signal produced by the first capacitive proximity sensor relative to the signal produced by the second capacitive proximity sensor to determine an orientation of the electronic device.

2. The electronic device of claim 1, further comprising a third capacitive proximity sensor on a side of the electronic device included in the housing.

3. The electronic device claimed in claim 2, wherein capacitive proximity gain or sensitivity of the first capacitive proximity sensor and the second capacitive proximity sensor is adaptively increased based on whether the third capacitive proximity sensor detects a touch on the side of the electronic device.

4. The electronic device claimed in claim 1, wherein the electronic device is configured to monitor directional polarity signal change between the first capacitive proximity sensor and the second capacitive proximity sensor.

5. The electronic device claimed in claim 1, further comprising a chassis ground loop surrounding the open loop conductor and the NFC loop antenna conductor.

6. The electronic device claimed in claim 1, further comprising a driven signaling open loop surrounding the NFC loop antenna conductor and a sensing signaling open loop surrounding the NFC loop antenna conductor.

7. The electronic device claimed in claim 1, further comprising capacitive sensing elements within the NFC loop antenna conductor.

8. The electronic device claimed in claim 1, wherein the first capacitive proximity sensor comprises a capacitive touchscreen for the electronic device.

9. A method performed by an electronic device, the method comprising:
   monitoring a signal produced by a motion sensor within a housing of an electronic device;
   monitoring a signal produced by a first capacitive proximity sensor on a front of the electronic device included in the housing;
   monitoring a signal produced by a second capacitive proximity sensor on a back of the electronic device included in the housing;
   monitoring a signal produced by a third capacitive proximity sensor on a side of the electronic device;
   comparing the signal produced by the first capacitive proximity sensor and the signal produced by the second capacitive proximity sensor;
   based on the comparing, determining a differential amount of change between the signal produced by the first capacitive proximity sensor relative to the signal produced by the second capacitive proximity sensor;
   determining whether the electronic device is in a pocket of a user based on:
     the determined differential amount of change; and
     a positional orientation of the electronic device based on the signal produced by the motion sensor; and
   adaptively increasing capacitive proximity gain or sensitivity of the first capacitive proximity sensor and the second capacitive proximity sensor based on whether the third capacitive proximity sensor detects a perimeter touch.

10. The method according to claim 9 wherein, adaptively increasing capacitive proximity gain or sensitivity of the first capacitive proximity sensor and the second capacitive proximity sensor is further based on whether the signal produced by the motion sensor indicates motion of the electronic device.

11. The method according to claim 9 further comprising:
    monitoring directional polarity signal change between the first capacitive proximity sensor and the second capacitive proximity sensor.

12. An apparatus practicing the method of claim 9.

13. An electronic device, comprising:
    a housing;
    a first capacitive proximity sensor on a front of the electronic device included in the housing;
    a second capacitive proximity sensor on a back of the electronic device included in the housing, the second capacitive proximity sensor comprising an impedance matching circuit including a near field communication (NFC) loop; and an open loop conductor surrounding the NFC loop and in close proximity to the NFC loop, wherein the electronic device is configured to:

monitor a signal produced by the first capacitive proximity sensor;

monitor a signal produced by the second capacitive proximity sensor;

compare the signal produced by the first capacitive proximity sensor with the signal produced by the second capacitive proximity sensor;

based on the comparison, determine a differential amount of change between the signal produced by the first capacitive proximity sensor relative to the signal produced by the second capacitive proximity sensor; and determine whether the front of the electronic device is in a user's pocket based on the differential amount of change.

14. The electronic device of claim 13, further comprising a third capacitive proximity sensor on a side of the electronic device included in the housing.

15. The electronic device claimed in claim 14, wherein capacitive proximity gain or sensitivity of the first capacitive proximity sensor and the second capacitive proximity sensor is adaptively increased based on whether the third capacitive proximity sensor detects a touch on the side of the electronic device.

* * * * *